(12) United States Patent
Shimasaki et al.

(10) Patent No.: US 7,928,152 B2
(45) Date of Patent: Apr. 19, 2011

(54) ELECTRODEPOSITION PAINT

(75) Inventors: Akihiko Shimasaki, Hiratsuka (JP);
Koji Kamikado, Yokohama (JP);
Masaharu Shimoda, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 428 days.

(21) Appl. No.: 11/129,422

(22) Filed: May 16, 2005

(65) Prior Publication Data

US 2005/0256229 A1 Nov. 17, 2005

(30) Foreign Application Priority Data

May 17, 2004 (JP) ................................ 2004-146183
Mar. 4, 2005 (JP) ................................ 2005-061058

(51) Int. Cl.
*C08L 63/00* (2006.01)
(52) U.S. Cl. ........................................ 523/415; 525/523
(58) Field of Classification Search .................. 523/415; 525/523
See application file for complete search history.

(56) References Cited

U.S. PATENT DOCUMENTS

| | | | | |
|---|---|---|---|---|
| 3,563,929 A * | 2/1971 | Guldenpfennig | ............. | 525/530 |
| 3,829,505 A * | 8/1974 | Herold | ........................... | 568/606 |
| 4,435,558 A * | 3/1984 | Burba et al. | ..................... | 528/45 |
| 4,468,307 A | 8/1984 | Wismer et al. | | |
| 4,689,131 A * | 8/1987 | Roue et al. | ..................... | 204/499 |
| 4,891,111 A | 1/1990 | McCollum et al. | | |
| 5,147,905 A * | 9/1992 | Dubois et al. | .................. | 523/404 |
| 5,202,390 A * | 4/1993 | Mulhaupt et al. | .............. | 525/426 |
| 5,314,971 A * | 5/1994 | Neffgen et al. | ................ | 525/504 |
| 5,350,636 A * | 9/1994 | Huemke et al. | ................ | 428/418 |
| 5,369,151 A * | 11/1994 | Fujibayashi et al. | .......... | 523/414 |
| 5,548,005 A * | 8/1996 | Kurth et al. | .................... | 523/414 |
| 5,556,913 A * | 9/1996 | Tobinaga et al. | .............. | 524/555 |
| 5,565,508 A * | 10/1996 | Hoenel et al. | .................. | 523/414 |
| 6,342,546 B1 | 1/2002 | Kato et al. | | |
| 6,410,635 B1* | 6/2002 | Kaylo et al. | ................... | 524/447 |
| 6,423,425 B1 | 7/2002 | Faucher et al. | | |
| 6,437,055 B1* | 8/2002 | Moriarity et al. | ............. | 525/437 |
| 2001/0027228 A1* | 10/2001 | Ando et al. | .................... | 524/243 |
| 2003/0176592 A1* | 9/2003 | Swarup et al. | ................ | 525/419 |

FOREIGN PATENT DOCUMENTS

EP 0 339 795 A2 11/1989
EP 1 314 768 A2 5/2003

* cited by examiner

*Primary Examiner* — Mark Eashoo
*Assistant Examiner* — David Karst
(74) *Attorney, Agent, or Firm* — Wenderoth, Lind & Ponack, L.L.P.

(57) ABSTRACT

The invention provides electrodeposition paint of reduced volatile organic compound content, in which specific polyether compound(s) having a molecular weight not more than 1,000 is(are) incorporated and which excel in corrosion resistance, electrocoating ability of rustproof steel sheet, film-forming ability, pin holing resistance and stability.

4 Claims, No Drawings

ELECTRODEPOSITION PAINT

TECHNICAL FIELD

This invention relates to electrodeposition paint of reduced volatile organic compound content, which excels in corrosion resistance, electrocoating ability of rustproof steel sheet, film-forming ability, pin holing resistance and stability.

BACKGROUND ART

Electrodeposition paint has been put to wide usages including coating bodies and other parts of automobiles, and development of electrodeposition paint compositions having various characteristics, for example, those excelling in corrosion resistance, electrocoating ability, of rustproof steel sheet, film-forming ability, stability and the like, has been attempted.

Namely, organic solvents having boiling points not higher than about 120° C. [e.g., methyl isobutyl ketone (116° C.), methyl ethyl ketone (80° C.) and the like]; organic solvents having boiling points ranging 120-200° C. [e.g., ethylene glycol monobutyl ether (171° C.), propylene glycol monomethyl ether (121° C.) and the like]; or low molecular weight soft resins of molecular weights not higher than 4,000 (e.g., xylene resin, polypropylene glycol and the like) are incorporated in electrodeposition paint compositions, for maintaining the latter's film-forming ability over prolonged periods. Recently, however, use of such organic solvents is restricted according to low VOC (Volatile Organic Compounds) regulations and HAPs (Hazardous Air Polutants) regulations, in consideration for preservation of good environments.

On the other hand, when the content of volatile organic compounds in electrodeposition paint is reduced, film-forming ability (film thickness retention) gradually deteriorates with time, rendering it difficult to apply the coating of a prescribed thickness. This also introduces a number of problems including impaired appearance and occurrence of pinholes (occasionally referred to as "gas" pinholes) in alloyed molten zinc-plated steel sheet (zinc-iron alloy-plated rustproof steel sheet) which is frequently used as outer panels of automobile bodies (e.g., doors, fenders and the like) to induce deficient coating.

It has been also practiced for the purpose of reducing the volatile organic compound content, to remove the content to volatile component such as an organic solvent in electrodeposition paint by reduced pressure distillation or the like means, until the content becomes not more than 1 wt %. It gives rise to problems such as coating to no thinner than 20 μm in terms of cured coating film thickness becomes difficult, or melt fusing ability of the coating film is deteriorated, which leads to easier occurrence of pinholes.

U.S. Pat. No. 4,891,111 discloses a cationic electrodepositon paint which contains alkylated polyether having at least three ethereal oxygen atoms and 1-4 saturated hydrocarbon groups between the ethereal oxygen atoms per molecule but having no hydroxyl group. This cationic electrodeposition paint has a low VOC content and its coating film exhibits good appearance and corrosion resistance, but has problems in electrocoating ability for rustproof steel sheet, film-forming ability and paint stability. The paint, therefore, is not fully satisfactory.

U.S. Pat. No. 6,342,546 discloses a cationic electrodeposition paint which contains alkylene polyether polyol such as polymethylene glycol, polyethylene glycol, polypropylene glycol, bolybutylene glycol and the like; or polyether polyol such as aromatic ring-containing polyether polyol obtained with use of bisphenol alone or in combination with glycol. This cationic electrodeposition paint has a low VOC content and favorable film-forming property, and gives coating film excellent in electrocoating ability of rustproof steel sheet (i.e., pinholing resistant property in alloyed molten zinc-plated steel sheet) and corrosion resistance. On the other hand, when a large amount of the polyether polyol is added to the paint, problems arise such as deterioration in the corrosion resistance (the deterioration is drastic under severe corrosive environments) or paint stability and reduction in sealer adherability onto the electrocoated film.

DISCLOSURE OF THE INVENTION

An object of the present invention is to provide an electrodeposition paint having a low volatile organic compound content and excellent corrosion resistance, electrocoating ability for rustproof steel sheet, film-forming ability, pinholing resistant property and paint stability.

In consequence of concentrative studies, we now discovered that the above object could be accomplished by blending a specific polyether compound having a molecular weight not more than 1,000 with an electrodeposition paint, and have completed the present invention.

Thus, according to the present invention, an electrodeposition paint is provided, which contains at least one polyether compound which is selected from the group of compounds represented by the following formulae (1)-(4).

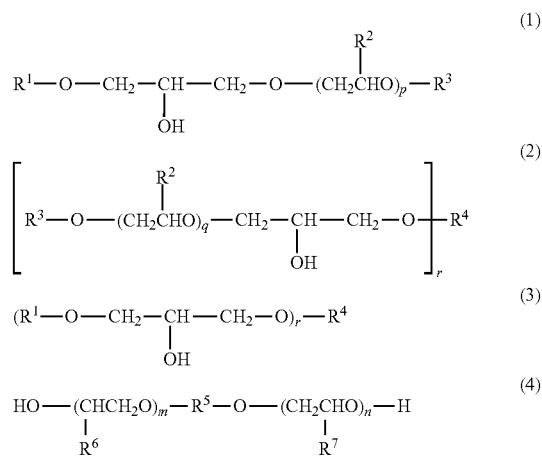

in which
$R^1$ and $R^3$ stand for $C_{1-10}$ alkyl or phenyl independently of each other,
$R^2$ stands for hydrogen or methyl, and where each of p and q is not less than 2, the plural $R^2$s in the formula (1) or (2) may be the same or different,
$R^4$ stands for $C_2$-$C_{10}$ r-valent aliphatic or alicyclic hydrocarbon,
$R^5$ stands for $C_{4-24}$ straight chain or branched chain alkylene,
$R^6$ and $R^7$ stand for hydrogen, methyl or ethyl independently of each other, and where each of m and n is not less than 2, the plural $R^6$s or $R^7$s in the formula (4) may be the same or different,
p is an integer of 0-4,
q is an integer of 1-4,
r is an integer of 2-4, and
m and n are integers of 1-10, independently of each other.

The electrodeposition paint according to the present invention has a low volatile organic compound content and coating film formed therefrom is excellent not only in corrosion resistance and appearance but also in film-forming property and exhibits superb characteristics that its electrocoated alloyed molten zinc-plated steel sheet does not develop pinholes. The electrodeposition paint of the present invention is excellent also in stability, and above-described characteristic properties do not change over a long period after it was used in coating lines.

The reasons for these excellent properties exhibited by the electrodeposition paint of the present invention are not yet fully understood. Concerning the corrosion resistance, the three-dimensional reticulated structure formed by crosslinking of the hydroxyl groups of those compounds of the formulae (1)-(4) in the coating film as reacting with a main resin or hardening agent in the paint composition is presumed to improve the resistance to corrosive substances of external origin. Again, concerning finished appearance, those compounds of the formulae (1)-(4) are presumed to favorably affect flow characteristics of the paint composition at the time of baking, because they have relatively low molecular weights.

Furthermore, those compounds of the formulae (1)-(4) are considered to act as plasticizer to soften the precipitated coating film per se, to fill up pinholes formed during the electrodeposition coating, under the influence of Joule heat generated during the electro coating.

Hereafter the electrodeposition paint of the present invention is explained in further details.

The novel, characteristic feature of the electrodeposition paints according to the present invention is that they contain at least one polyether compound selected from the group of the polyether compounds represented by the formulae (1), (2), (3) and (4), as an additive. Therefore, these polyether compounds are explained first.

The polyether compounds which are used in the invention are desirably easily soluble or dispersible in electrocoating bath. Generally those having molecular weight ranging 100-1,000, in particular, 250-800, inter alia, 250-600, are preferred.

The polyether compounds useful as the additive in the invention, which are represented by the following formula (1);

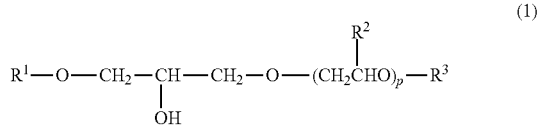

(1)

in which $R^1$ and $R^3$ stand for $C_{1-10}$, preferably $C_{2-9}$, in particular, $C_{3-8}$, alkyl or phenyl independently of each other, $R^2$ stands for hydrogen or methyl, and where p is 2 or more, the plural $R^2$s may be the same or different from each other, and p is an integer of 0-4, can be obtained by, for example, reacting a glycidyl ether compound of the following formula (5):

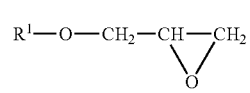

(5)

in which $R^1$ has the same signification as above, with an alcoholic compound of the following formula (6):

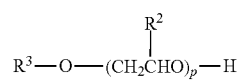

(6)

in which $R^2$, $R^3$ and p have the same significations as above.

As examples of the glycidyl ether compounds of the formula (5), butyl glycidyl ether, 2-ethylhexyl ether, phenyl glycidyl ether and the like can be named.

Also as examples of the alcoholic compound of the formula (6), ethylene glycol, monobutyl ether, ethylene glycol mono-2-ethylhexyl ether, diethylene glycol mono-2-ethylhexyl ether, ethylene glycol monohexyl ether, propylene glycol monomethyl ether, propylene glycol monobutyl ether, butanol and the like can be named.

The use ratio of the alcoholic compound of the formula (6) to the glycidyl ether compound of the formula (5) is not strictly limited, but generally adopted ratio ranges 0.5-2 moles, in particular, 0.5-1.5 moles, inter alia, 1-1.2 moles, of the alcoholic compound of the formula (6) per mole of the glycidyl ether compound of the formula (5).

The reaction can be effected normally by introducing an alcoholic compound of the formula (6) into a glycidyl ether compound of the formula (5), in the absence of a solvent or in a suitable inert solvent at a temperature of from about 50 to about 150° C., preferably from about 130 to about 140° C., consuming around 30 minutes-6 hours, preferably for around 1-3 hours. The reaction product may be used as it is, or after unreacted reactants are distilled off from the product under reduced pressure.

As the solvent useful in the above reaction, for example, hydrocarbon solvent such as toluene, xylene, cyclohexane, n-hexane and the like; ester solvent such as methyl acetate, ethyl acetate, butyl acetate and the like; ketone solvent such as acetone, methyl ethyl ketone, methyl isobutyl ketone, methyl amyl ketone and the like; or their mixtures can be named.

Those polyol compounds represented by the following formula (2):

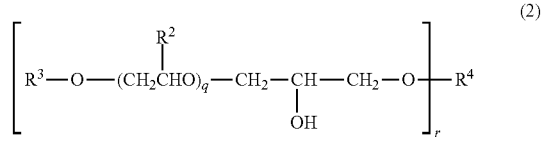

(2)

in which $R^2$ stands for hydrogen or methyl, and where q is 2 or more, the plural $R^2$s in the formula may be the same or different from each other, $R^3$ stands for $C_{1-10}$, preferably $C_{2-9}$, inter alia, $C_{3-8}$, alkyl or phenyl, $R^4$ stands for $C_{2-10}$, preferably $C_{3-9}$, inter alia, $C_{4-8}$, r-valent aliphatic or alicyclic hydrocarbon, q is an integer of 1-4, and r is an integer of 2-4, which are used as the additive in the present invention can be obtained, for example, by reacting a polyglycidyl compound represented by the following formula (7):

  (7)

in which $R^4$ and r have the same significations as above, with an alcoholic compound of the following formula (8):

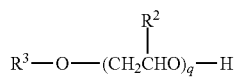  (8)

in which $R^2$, $R^3$ and q have the same significations as above.

As examples of the polyglycidyl compounds of the above formula (7), trimethylol triglycidyl ether, glycerol triglycidyl ether and the like can be named.

Also as the alcoholic compounds of the formula (8), those named as examples of the alcoholic compounds of the formula (6) can be used, except butanol.

The use ratio of the alcoholic compound of the formula (8) to the polyglycidyl compound of the formula (7) is not strictly limited, but generally 0.5-2 moles, preferably, 0.5-1.5 moles, inter alia, 1-1.2 moles of the alcoholic compound of the formula (8) is used per glycidyl equivalent of the polyglycidyl compound of the formula (7).

The above reaction can be normally conducted by introducing an alcoholic compound of the formula (8) into a polyglycidyl compound of the formula (7) in the absence of solvent or in a suitable inert solvent, over a period of from about 30 minutes to about 6 hours, preferably from about an hour to 3 hours, at a temperature within a range of from about 50° to about 150° C., preferably from about 130° to about 140° C. The reaction product may be used as it is or after removing therefrom the unreacted substances by distillation under reduced pressure.

As the solvent useful in the above reaction, for example, hydrocarbon solvent such as toluene, xylene, cyclohexane, n-hexane and the like; ester solvent such as methyl acetate, ethyl acetate, butyl acetate and the like; ketone solvent such as acetone, methyl ethyl ketone, methyl isobutyl ketone, methyl amyl ketone and the like; or their mixtures can be named.

The polyether compound represented by the following formula (3):

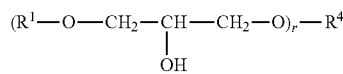  (3)

in which $R^1$ stands for $C_{1-10}$, preferably $C_{2-9}$, inter alia, $C_{3-8}$, alkyl or phenyl, R4 stands for $C_{2-10}$, preferably $C_{3-9}$, inter alia, $C_{4-8}$, r-valent aliphatic or alicyclic hydrocarbon, and r is an integer of 2-4, which is useful as the additive according to the present invention, can be obtained by reacting a glycidyl ether compound of the formula (5) with a polyhydric alcohol of the following formula (9):

 (9)

in which $R^4$ and r have the same significations as above.

As the polyhydric alcohol of above formula (9), for example, ethylene glycol, propylene glycol, dietylene glycol, trimethylene glycol, tetramethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-cyclohexanedimethanol, neopentyl glycol; glycerine, trimethylolpropane, trimetyloletane, diglycerine, triglycerine, 1,2,6-hexanetriol, pentaerythritol, dipentaerythritol, sorbitol and the like can be named. Of these, ethylene glycol and 1,4-butanediol are particularly preferred.

The use ratio of the polyhydric alcohol of the formula (9) to the glycidyl ether compound of the formula (5) is not strictly limited, while it is generally preferred to use them within such ratios that the hydroxyl groups in the polyhydric alcohol are present in an amount of 0.5-2 equivalents, in particular, 0.5-1.5 equivalents, per equivalent of glycidyl group in the glycidyl ether compound of the formula (5).

The above reaction can be normally conducted by introducing a polyhydric alcohol compound of the formula (9) into a glycidyl ether compound of the formula (5), in the absence of solvent or in a suitable inert solvent, over a period of from about 30 minutes to about 6 hours, preferably from about an hour to about 3 hours, at a temperature within a range of from about 50° to about 150° C., preferably from about 130° to about 140° C. The reaction product may be used as it is or after removing therefrom the unreacted substances by distillation under reduced pressure.

As the solvent useful in the above reaction, for example, hydrocarbon solvent such as toluene, xylene, cyclohexane, n-hexane and the like; ester solvent such as methyl acetate, ethyl acetate, butyl acetate and the like; ketone solvent such as acetone, methyl ethyl ketone, methyl isobutyl ketone, methyl amyl ketone and the like; and their mixtures may be named.

The polyether compound represented by the following formula (4):

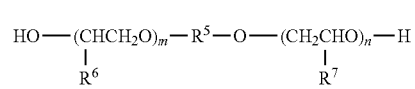 (4)

in which $R^5$ stands for $C_{4-24}$, preferably $C_{5-18}$, inter alia, $C_{6-15}$, straight chain or branched chain alkylene, $R^6$ and $R^7$ stand for hydrogen, methyl or ethyl independently of each other, and where each of m and n is not less than 2, the plural $R^6$s or $R^7$s in the formula may be the same or different, each of m and n independently stands for an integer of 1-10, preferably 1-7, inter alia, 1-5, and each of the polyoxyalkylene moieties $(CH(R^6)CH_2O)_m$ and $(CH(R^7)CH_2O)_n$ in the formula may be of a homopolymer type wherein the m-$R^6$s and n-$R^7$s in the respective recurring units are the same, or may be a random or block copolymer type wherein the m-$R^6$s and n-$R^7$s in the respective recurring units are different from each other, which is used as the additive according the invention, can be obtained through a reaction (addition reaction) of, for example, a diol represented by the following formula (10):

$$HO—R^5—OH \quad (10)$$

in which $R^5$ has the same signification as above with alkylene oxides represented by the following formulae (11) and (12):

(11)

(12)

in which $R^6$ and $R^7$ have the same significations as above.

As examples of the diol represented by the above formula (10), 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 2-methyl-1,3-propanediol, 2-butyl-2-ethyl-1,3-propanediol, 3-methyl-4,3-pentanediol, 3-methyl-4,5-pentanediol, 2,2,4-trimethyl-1,3-pentanediol, 1,6-hexanediol, 1,5-hexanediol, 2,5-hexanediol, neopentyl glycol and the like are named. Of these, 2-methyl-1,3-propanediol and 2-butyl-2-ethyl-1,3-propanediol are particularly preferred.

Those alkylene oxides represented by the above formula (11) or (12) include ethylene oxide, propylene oxide and butylenes oxide.

Use ratio of the alkylene oxides of the formulae (11) and (12) to the diol of the formula (10) is not strictly limited, while it is generally preferred to use 1-10 moles, in particular, 1-7 moles, inter alia, 1-5 moles, of alkylene oxides of the formulae (11) and (12) as combined, per hydroxyl equivalent in the diol of the formula (2).

The above reaction can be normally conducted by introducing alkylene oxides of the formulae (11) and (12) into a diol of the formula (10) in the absence of solvent or in a suitable inert solvent, over a period of from about 30 minutes to about 6 hours, preferably from about an hour to about 3 hours, at a temperature within a range of from about 50° to about 150° C., preferably from about 130° C. to about 140° C. The reaction product may be used as it is or after removing therefrom the unreacted substances by distillation under reduced pressure.

Where two or more alkylene oxides are used as those of the formulae (11) and (12), they may be added simultaneously, or separately by any optional order. For example, when ethylene oxide and propylene oxide are concurrently used, first a minor amount of propylene oxide is added and allowed to react, and thereafter ethylene oxide is added and allowed to react.

As examples of solvent useful in the above reaction, hydrocarbon solvent such as toluene, xylene, cyclohexane, n-hexane and the like; ester solvent such as methyl acetate, ethyl acetate, butyl acetate and the like; ketone solvent such as acetone, methyl ethyl ketone, methyl isobutyl ketone, methyl amyl ketone and the like; or their mixtures can be named.

The polyether compound or compounds selected from those of formulae (1), (2), (3) and (4) prepared as above, is (are) blended in electrodeposition paint, preferably cationic electrodeposition paint, which comprises a main resin and a hardening agent. Those polyether compounds may be used either singly or in combination of two or more kinds.

In the following, explanation is given as to a typical cationic electrodeposition paint which contains cationic resin as its main resin and blocked polyisocyanate compound as the hardening agent, it being understood that the invention is not limited to such.

The cationic resin which is used as the main resin refers to such resins which contain in their molecules cationizable groups such as amino, ammonium salt, sulfonium salt, phosphonium salt or the like groups. The resin may be any of those customarily used as resins for electrodeposition paint, for example, epoxy resin, acrylic resin, polybutadiene resin, alkyd resin, polyester resin and the like. In particular, amine-added epoxy resin which is obtained through addition reaction of epoxy resin with amino-containing compound is preferred.

As examples of such amine-added epoxy resin, (1) adducts of epoxy resin with primary mono- and poly-amines, secondary mono- and poly-amines, or mixed primary and secondary polyamines (see, for example, U.S. Pat. No. 3,984,299); (2) adducts of epoxy resin with secondary mono- and poly-amines having ketiminated primary amino groups (see, for example, U.S. Pat. No. 4,017,438); (3) reaction products obtained by etherification of epoxy resin and hydroxyl compound having ketiminated primary amino groups (see, for example, JP Sho 59 (1984)-43013A) and the like can be named.

The epoxy resin which is used for the preparation of above amine-added epoxy resin is a compound having at least one, preferably two or more, epoxy groups per molecule. Generally those having number-average molecular weight[Note 1)] of at least 200, preferably 400-4,000, inter alia, 800-25,00; and epoxy equivalents of at least 160, preferably in the range of 180-2,500, inter alia, 400-1,500, are suitable. In particular, those obtained through reaction of polyphenol compound with epihalohydrine are prefered.

Note 1) number-average molecular weight: a value calculated from the chromatogram taken by RI refractometer and polystyrene calibration curve following the method specified by JIS K 0124-83, using TSK GEL 4000 $H_{XL}$+ G3000$H_{XL}$+G2500$H_{XL}$+G2000$H_{XL}$ (Tosoh Corporation) as the separation column and tetrahydrofuran for tGPC as the eluent, at 40° C. and flow rate of 1.0 ml/min.

As examples of the polyphenol compound useful for forming the epoxy resin, bis (4-hydroxyphenyl)-2,2-propane, 4,4'-dihydroxybenzophenone, bis(4-hydroxyphenyl)-1,1-ethane), bis-(4-hydroxyphenyl)-1,1-isobutane, bis (4-hydroxy-2 or 3-tert-butylphenyl)-2,2-propane, bis (2-hydroxynaphthyl)methane, tetra (4-hydroxyphenyl)-1,1,2,2-ethane, 4,4'-dihydroxydiphenylsulfone, phenol novolac, cresol novolac and the like can be named.

The epoxy resins may be those which are partially reacted with polyol, polyether polyol, polyester polyol, polyamidamine, polycarboxylic acid, polyisocyanate compound or the like. Furthermore, they may be those which are graft polymerized with caprolactone such as ϵ-caprolactone, acrylic monomer or the like.

As examples of primary mono- and poly-amines, secondary mono- and poly-amines or mixed primary and secondary polyamines, which are used for preparing above amine-added epoxy resin (1), mono- or di-alkylamines such as monomethylamine, dimethylamine, monoethylamine, diethylamine, monoisopropylamine, diisopropylamine, monobutylamine, dibutylamine and the like; alkanolamines such as monoethanolamine, diethanolamine, mono(2-hydroxypropyl)amine, monomethylaminoethanol and the like; and alkylenepolyamines such as ethylnediamine, propylenediamine, butylenediamine, hexamethylenediamine, diethylenetriamine, triethylenetetramine and the like can be named.

As the secondary mono- and poly-amines having ketiminated primary amino groups which are used in preparation of above amino-added epoxy resin (2), for example, ketimination products obtained by reacting the compounds which are selected from the primary mono- and poly-amines, secondary mono- and poly-amines and mixed primary and secondary polyamines that are used for preparing above amine-added epoxy resin (1), and which have primary amino groups (e.g., monomethylamine, monoethanolamine, ethylenediamine, diethylenetriamine and the like), with ketone compound can be used.

As the hydroxyl compounds having ketiminated primary amino groups which are used for preparation of above amine-added epoxy resin (3), for example, hydroxyl-containing ketimination products obtained by reacting the compounds which are selected from the primary mono- and poly-amines, secondary mono- and poly-amines and mixed primary and secondary polyamines that are used for preparation of above amine-added epoxy resin (1) and which have primary amino groups and hydroxyl groups (e.g., monoethanolamine, mono (2-hydroxypropyl) amine and the like), with ketone compound can be used.

Above amine-added epoxy resins further include polyol-modified amine-added epoxy resin, which is prepared by reacting the epoxy resin, a polyol compound obtained by adding caprolactone to a compound having at least two active hydrogen-containing groups per molecule, and an amino-containing compound. Such polyol-modifed amine-added epoxy resin can be advantageously used.

As the compound containing at least two active hydrogen-containing groups per molecule, generally those having a molecular weight within a range of 62-5,000, in particular, 70-3,000, and containing 2-30, in particular, 3-25, active hydrogen-containing groups per molecule are preferred. As examples of active hydrogen-containing groups, hydroxyl, primary amino, secondary amino and the like can be named.

Specific examples of the compound containing at least two active hydrogen-containing groups per molecule include low-molecular weight polyols such as ethylene glycol, propylene glycol, 1,3-butylene glycol, 1,4-butanediol, 1,6-hexanediol, diethylene glycol, dipropylene glycol, neopentyl glycol, glycerine, trimetylolpropane, pentaerythitol and the like; linear or branced polyether polyols such as polyethylene glycol, polypropylene glycol, polytetramethylene glycol, bisphenol A polyethylene glycol ether and the like; polyester polyols obtained by polycondensation reaction of organic dicarboxylic acid such as succinic acid, adipic acid, azelaic acid, sebacic acid, maleic acid, cyclohexanedicarboxylic acid, phthalic acid, isophathalic acid, terephthalic acid and the like or their anhydrides with organic diols such as above-named low molecular-weight polyols under conditions of the organic diol excess; amine compounds such as butylenediamine, hexamethylenediamine, tetraethylenepentamine, pentaethylenehexamine, monoethanolamine, diethanolamine, triethanolamine, mono(2-hydroxypropyl)amine, di(2-hydroxypropyl) amine, 1,3-bisaminomethylcyclohexanone, isophoronediamine, xylylenediamine, meta-xylylenediamine, diaminodiphenylmethane, phenylenediamine, ethylenediamine, propylenediamine, diethylenetriamine, triethylenetetramine and the like; piperazine, polyamides derived from these amine compounds, polyamidamine, amine adducts with epoxy compounds, ketimine, aldimine and the like.

As the caprolactone which is subjected to the addition reaction with a compound having at least two active hydrogen-containing groups per molecule, for example, γ-caprolactone, ε-caprolactone, δ-caprolactone and the like can be named, ε-caprolactone being particularly preferred.

The addition reaction of a compound having at least two active hydrogen-containing groups per molecule with caprolactone can be conducted by a method known per se, and through the reaction those polyol compounds can be prepared.

The amino-containing compound which is used for preparing the polyol-modified amine-added epoxy resin is the component for imparting cationic property, by introducing amino groups into the resin and cationizing the same. As the compound, one having at least one active hydrogen reactable with epoxy group can be used.

As specific examples, those useful as primary mono- and poly-amines, secondary mono- and poly-amines and mixed primary and secondary polyamines which are used for preparing the amine-added epoxy resin (1); secondary mono- and poly-amines having ketiminated primary amino groups, which are used for preparing the amine-added epoxy resin (2); and hydroxy compounds having ketiminated primary amino groups, which are used for preparing the amine-added epoxy resin (3) can be named.

As the cationic resins, generally those having number-average molecular weight within a range of 700-6,000, in particular, 1,000-4,000, and containing 0.5-3 equivalents, in particular, 0.7-2 equivalents, of cationic groups per/kg of the resin, are preferred.

Where the cationic resin has amino radicals as cationizable groups, it can be rendered water-soluble or water-dispersible by neutralization with acid such as organic carboxylic acids including formic acid, acetic acid, propionic acid, lactic acid and the like; or inorganic acids such as hydrochloric acid, sulfuric acid and the like. Whereas, when the resin has as cationizable group an onium salt such as ammonium salt, sulfonium salt, phosphonium salt or the like, it can be rendered water-soluble or water-dispersible as it is, without the preceding neutralization.

Useful main resins further include amino-containing epoxy resins which are obtained by reacting an epoxy resin containing 180-3,000, preferably 250-2,000, epoxy equivalents with xylene-formaldehyde resin and amino-containing compound.

As the epoxy resin useful as a starting material for preparing the amino-containing epoxy resin, those useful for aforesaid cationic resins can be conveniently used.

Xylene-formaldehyde resin is used for internal plasticization (modification) of the epoxy resin, which can be prepared, for example, by subjecting xylene, formaldehyde and optionally phenols to a condensation reaction in the presence of an acidic catalyst.

As the formaldehyde, for example, industrially readily available formalin, paraformaldehyde, compounds which generate formaldehyde such as trioxane, and the like can be used.

The phenols include monohydric or dihydric phenolic compounds having 2 or 3 reaction sites. As specific examples, phenol, cresol, para-octyphenol, nonylphenol, bisphenolpropane, bisphenolmethane, resorcine, pyrocatechol, hydroquinone, para-tert-butylphenol, bisphenolsulfone, bisphenol ether, para-phenylphenol and the like can be named. Those can be used either singly or in combination of two or more. Of those, phenol and cresol are the preferred.

As the acid catalyst useful in the condensation reaction of xylene, formaldehyde, and optionally phenols, for example, sulfuric acid, hydrochloric acid, paratoluenesulfonic acid, oxalic acid and the like can be named. In general, sulfuric acid is particularly suitable.

The condensation reaction can be conducted by heating the reaction system, for example, to a temperature at which xylene, phenols, water, formalin and the like that are present in the reaction system reflux, normally to about 80° C.-about 100° C. The reaction can be completed normally in about 2-6 hours.

Xylene-formaldehyde resin can be obtained by thermally reacting xylene, formaldehyde and optionally phenols in the presence of an acidic catalyst, under the above-described conditions.

Thus obtained xylene-formaldehyde resin normally has a viscosity value within a range of 20-50,000 centipoise (25° C.), preferably 25-30,000 centipoise (25° C.), inter alia, 30-15,000 centipoise (25° C.), and preferably has 100-50,000, in particular, 150-30,000, inter alia, 200-10,000, hydroxyl equivalents.

The amino-containing compound is a cationic property-imparting component, which cationizes the epoxy resin by introducing amino groups into the resin. As specific examples, compounds similar to those used in the occasion of preparing aforesaid cationic resins can be used.

Above reactions of xylene-formaldehyde resin and amino-containing compound with epoxy resin can be conducted by optional order, while it is generally preferred to have the xylene-formaldehyde resin and the amino-containing compound simultaneously react with the epoxy resin.

The above addition reaction is normally conducted in a suitable solvent at temperatures between about 80 and about 170° C., preferably between about 90 and about 150° C., for around 1-6 hours, preferably around 1-5 hours. As the solvent, for example, hydrocarbon solvent such as toluene, xylene, cyclohexane, n-hexane and the like; ester solvent such as methyl acetate, ethyl acetate, butyl acetate and the like; ketone solvent such as acetone, methyl ethyl ketone, methyl isobutyl ketone, methyl amyl ketone and the like; amide solvent such as dimethylformamide, dimethylacetamide and the like; alcohol solvent such as methanol, ethanol, n-propanol, iso-propanol and the like; or mixtures of the foregoing can be used.

The use ratios of the reactants in the above addition reacting are not critical and can be suitably altered, while their generally adequate ranges based on the total solid weight of the three components of epoxy resin, xylene-formaldehyde resin and amino-containing compound are as follows: epoxy resin, 50-90 wt %, preferably 50-85 wt %; xylene-formaldehyde resin, 5-45 wt %, preferably 6-43 wt %; and amino-containing compound, 5-25 wt %, preferably 6-20 wt %.

As a hardening agent which is used concurrently with above-described main resin, blocked polyisocyanate compound which is a product of approximately stoichiometric addition reaction of a polyisocyanate compound and a blocking agent is preferred in respect of hardening property and corrosion resistance.

As the polyisocyanate compound, those already known can be used, for example, aromatic, aliphatic or alicyclic polyisocyanate compounds such as tolylenediisocyanate, xylylenediisocyanate, phenylendiisocyanate, diphenylmethane-2,4'-diisocyanate, diphenylmethane-4,4'-diisocyanate (occasionally referred to as MDI), crude MDI, bis(isocyanatemethyl)cyclohexane, tetramethylenediisocyanate, hexamethylenediisocyanate, methylenediisocyanate, isophoronediisocyanate and the like; cyclized polymers of these polyisocyanate compounds, isocyanate biuret compounds; terminal isocyanate-containig compounds that are obtained through reaction of an excessive amount of these polyisocyanate compounds with low molecular weight, active hydrogen-containing compounds such as ethylene glycol, propylene glycol, trimethylolpropane, hexanetriol, caster oil and the like. These can be used either singly or in combination of two or more.

On the other hand, the blocking agent adds to isocyanate groups of a polyisocyanate compound and blocks them. The blocked polyisocyanate compound formed upon the addition is preferably such that it is stable at normal temperature but the blocking agent dissociates when it is heated to a baking temperature of coating film (normally about 100-about 200° C.) to regenerate free isocyanate groups.

As blocking agents which satisfy such requirements, for example, lactam compounds such as ε-caprolactam, γ-butyrolactam and the like; oxime compounds such as methyl ethyl ketoxime, cyclohexanonoxime and the like; phenolic compounds such as phenol, para-t-butylphenol, cresol and the like; aliphatic alcohols such as n-butanol, 2-ehtylhexanol and the like; aromatic alkylalcohols such as pheneylcarbinol, methylphenylcarbinol and the like; and ether alcoholes such as ethylene glycol monobutyl ether, diethylene glycol monoethyl ether and the like can be named.

Blocked polyisocyanates in which diols of the molecular weight ranging 76-150 or carboxyl-containing diols of the molecular weight ranging 106-500 are used as the blocking agent can also be used as the hardening agent.

The diols can be those having two hydroxyl groups of different reactivity in combination, e.g., primary hydroxyl and secondary hydroxyl, primary hydroxyl and tertiary hydroxyl, secondary hydroxyl and tertiary hydroxyl, and molecular weight of 76-150, for example, diols having two hydroxyl groups of different reactivity such as propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol, 1,4-hexanediol and the like.

Of those, propylene glycol is preferred in respect of reactivity of resulting blocked polyisocyanate, reduction in weight decrease under heating and storage stability of paint. In these diols, normally the hydroxyl group of the higher reactivity first reacts with the isocyanate group to block the latter.

The carboxyl-containing diols include those of the molecular weight ranging 106-500. Because they contain carboxyl groups in their molecules, they exhibit improved low temperature dissociation, which leads to improved hardening property. In particular, when organic tin compound is used as the hardening catalyst, the low temperature hardening ability can be markedly improved.

As examples of carboxyl-containing diols, 2,2-dimethylolpropionic acid, 2,2-dimethylolbutanoic acid, dimethylolvarelic acid, glyceric acid and the like can be named.

The main resin and hardening agent as described above can be used generally within the ranges of, respectively, 50-95 wt %, in particular, 65-85 wt %, of the main resin; and 5-50 wt %, in particular, 15-35 wt %, of the hardening agent; based on the total solid of the two components. Also the cationic electrodeposition paint can contain the main resin and hardening agent, as their combined solid, at a concentration within a range of 10-40 wt %, in particular, 15-25 wt %.

The cationic electrodeposition paint according to the present invention can contain, besides at least one polyether compound selected from the group consisting of those of the formulae (1), (2), (3) and (4), main resin and hardening agent, as necessity demands, other additives for paint, for example, coloring pigment, extender, rust-proofing pigment, organic solvent, pigment dispersant, surface regulator, surfactant, acid, catalyst and the like, each in a customarily used amount.

Above-described polyether compound, amine-added epoxy resin as the main resin and blocked polyisocyanate compound as the hardening agent can be suitably made water-dispersible concurrently with other additives for paint, to provide an emulsion of cationic electrodeposition paint.

Such an emulsion can be formulated by combining at least one polyether compound selected from the group consisting of those of the formulae (1), (2), (3) and (4), main resin, hardening agent and optionally other additives for paint, thoroughly blending them to form a varnish solution, adding thereto in an aqueous medium a neutralizing agent selected from formic acid, acetic acid, lactic acid. propionic acid, citric acid, malic acid, sulfamic acid and mixtures of two or more of them.

The blend ratio of the polyether compound or compounds selected from the group consisting of those of the formulae (1), (2), (3) and (4) is variable depending on, for example, the kind of electrodeposition paint which is blended therewith. In general terms, a range of 0.1-20 wt parts, in particular, 1-10 wt parts, inter alia, 2-8 wt parts, as solid, per 100 wt parts of combined solid contents of the main resin and the hardening agent, is convenient in respect of the paint stability.

Then a pigment-dispersed paste is added to the emulsion of cationic electrodeposition paint, followed by dilution with an aqueous medium where necessary, to formulate a cationic electrodeposition paint. So prepared electrodeposition paint is applicable onto desired substrate surface by means of electrocoating.

Electrocoating is operable, in general terms, using a bath of the cationic electrodeposition paint, which has been diluted with deionized water or the like to a solid concentration of from about 5 to about 40 wt % and at a pH adjusted to a range of 5.5-9.0, normally under the conditions of 15-35° C. in bath temperature and at an impressed voltage of 100-400 V.

The coating film thickness formed of the cationic electrodeposition paint is subject to no particular limitation, while a generally preferred range is 10-40 μm in terms of the hardened coating film.

Generally adequate baking temperature of the coating film ranges from about 120 to about 200° C., in particular, from about 140 to about 180° C.; and the baking time can normally range around 5-60 minutes, preferably 10-30 minutes.

The electrodeposition paint of the present invention which contains at least one polyether compound selected from the group consisting of those represented by the formulae (1), (2), (3) and (4) has characteristic properties such as a low volatile organic solvent content and excellent corrosion resistance, electrocoating ability on the rustproof steel sheet, film-forming ability and the like. Furthermore, it excels in stability and above characteristic properties do not change after stirring in the open air over a long period in a coating line bath.

EXAMPLES

Hereinafter the invention is further specifically explained referring to working Examples, it being understood that the invention is not limited to these Examples only. In the following, parts and percentages are by weight.

Production Example 1

Additive No. 1

A reaction vessel was charged with 264 parts of butyl glycidyl ether (molecular weight: about 130) and 261 parts of ethylene glycol mono-2-ethylhexyl ether (molecular weight: about 174), and its temperature was raised to 100° C. Upon subsequent agitation for 3 hours while maintaining this temperature, additive No. 1 (solid resin content: 100%) having average molecular weight of 304 was obtained.

Production Example 2

Additive No. 2

A reaction vessel was charged with 288 parts of DENACOL EX-216L (Nagase Chemtex, trademark, cyclohexane diglycidyl ether, molecular weight: about 288) and 212.4 parts of ethylene glycol monobutyl ether (molecular weight: about 118), and its temperature was raised to 100° C. Upon subsequent agitation for 3 hours while maintaining this temperature, additive No. 2 (solid resin content: 100%) having average molecular weight of 406 was obtained.

Production Example 3

Additive No. 3

A reaction vessel was charged with 264 parts of butyl glycidyl ether (molecular weight: about 130) and 90.1 parts of 1,4-butanediol (polyhydric alcohol, molecular weight: about 90.1), and its temperature was raised to 100° C. Upon subsequent agitation for 3 hours while maintaining this temperature, additive No. 3 (solid resin content: 100%) having average molecular weight of 354 was obtained.

Production Example 4

Main Resin No. 1

A separable flask of 2 liters in capacity, which is was equipped with a thermometer, reflux condenser and a stirrer was charged with 240 parts of 50% formalin, 55 parts of phenol, 101 parts of 98% industrial sulfuric acid and 212 parts of meta-xylene, which were reacted at 84-88° C. for 4 hours. After termination of the reaction, the system was allowed to stand to separate the resin phase from the aqueous sulfuric acid phase. The resin phase was washed with water three times and removed of the unreacted meta-xylene for 20 minutes under the conditions of 20-30 mm Hg/120-130° C. to provide a xylene-formaldehyde resin (1) having viscosity of 1050 centipoise (25° C.).

Another flask was charged with 1,000 parts of EPICOAT 828 EL (Japanese Epoxy Resin Co., trademark, an epoxy resin having 190 epoxy equivalents and molecular weight of 350), 400 parts of bisphenol A and 0.2 part of dimethylbenzylamine, which were reacted at 130° C. until the epoxy equivalent number increased to 750.

Then 300 parts of above xylene-formaldehyde resin (1), 140 parts of diethanolamine and 65 parts of a keminated product of diethylenetriamine were added and reacted at 120° C. for 4 hours, followed by addition of 420 parts of ethylene glycol monobutyl ether. Thus a xylene-fomaldehyde resinmodified amino-containing epoxy resin (main resin No. 1) having amine value of 52 mgKOH/g and solid resin content of 80% was obtained.

Production Example 5

Main Resin No. 2

To 400 parts of PP-400 (Sanyo Kasei Co., trademark, polypropylene glycol, molecular weight: 400), 300 parts of ε-caprolactone was added and heated to 130° C. Then 0.01 part of tetrabutoxytitanium was added, and the temperature was further raised to 170° C. While maintaining this temperature, the reaction system was sampled as the reaction progressed, to trace unreacted ε-caprolactone with infrared absorption spectrometry, and at the time when the reaction ratio reached at least 98%, the system was cooled to provide modifier 1.

Separately, 400 parts of bisphenol A and 0.2 part of dimethylbenzylamine were added to 1,000 parts of EPICOAT 828 EL (Japan Epoxy Resin Co. Ltd., trademark, epoxy resin having 190 epoxy equivalents, molecular weight: 350), and reacted at 130° C. until the epoxy equivalent number increased to 750.

Into the reaction system 120 parts of nonylphenol was added and reacted at 130° C. until the epoxy equivalent number increased to 1,000. Then 200 parts of the modifier 1, 95 parts of diethanolamine and 65 parts of ketiminated diethylenetriamine were added, followed by 4 hours' reaction at 120° C. Thereafter 414 parts of ethylene glycol monobutyl ether was added to provide a polyol-modified amino-containing epoxy resin (main resin No. 2) having amine value of 40 mg KOH/g and solid resin content of 80%.

Production Example 6

Hardening Agent

To 270 parts of COSMONATE M-200 (Mitsui Chemical Co., trademark, crude MDI), 46 parts of methyl isobutyl ketone was added and heated to 70° C. Further 281 parts of diethylene glycol monoethyl ether was gradually added and then heated to 90° C.

While maintaining this temperature, the reaction system was sampled as the reaction progressed, until absence of absorption by unreacted isocyanate was confirmed by infrared absorption spectrometry. Then the reaction was stopped and the solvent content was adjusted to provide a blocked polyisocyanate-type hardening agent having a solid content of 90%.

Production Example 7

Emulsion No. 1

Additive No. 1 as obtained in Production Example 1, 6.25 parts (solid content: 5 parts); main resin No. 1, 50 parts (solid content: 40 parts); main resin No. 2, 37.5 parts (solid content: 30 parts); the hardening agent, 33.3 parts (solid content: 30 parts); and 10% formic acid, 8.2 parts were blended and uniformly stirred, into which 173.8 parts of deionized water was added dropwise over about 15 minutes, under vigorous stirring. Emulsion No. 1 having a solid content of 34% was obtained.

Production Examples 8-12

Emulsion Nos. 2-6

At the blended ratios as given in Table 1, emulsion Nos. 2-6 each having a solid content of 34% were obtained through similar procedures as in Production Example 7.

TABLE 1

| | Emulsion | Production Example 7 No. 1 | Production Example 8 No. 2 | Production Example 9 No. 3 | Production Example 10 No. 4 | Production Example 11 No. 5 | Production Example 12 No. 6 |
|---|---|---|---|---|---|---|---|
| Additive | Additive No. 1 | 5 (5) | | | | | |
| | Additive No. 2 | | 5 (5) | | | | |
| | Additive No. 3 | | | 5 (5) | | | |
| | Polyether polyol (a) (Note 2) | | | | 5 (5) | | |
| | SUNNIX PP-1000 (Note 3) | | | | | 5 (5) | |
| Main resin | Main resin No. 1 | 50 (40) | 50 (40) | 50 (40) | 50 (40) | 50 (40) | 50 (40) |
| | Main resin No 2 | 37.5 (30) | 37.5 (30) | 37.5 (30) | 37.5 (30) | 37.5 (30) | 37.5 (30) |
| Hardening agent | Hardening gent | 33.3 (30) | 33.3 (30) | 33.3 (30) | 33.3 (30) | 33.3 (30) | 33.3 (30) |
| Neutralizing | 10% | 8.2 | 8.2 | 8.2 | 8.2 | 8.2 | 8.2 |

TABLE 1-continued

| | Emulsion | Production Example 7 No. 1 | Production Example 8 No. 2 | Production Example 9 No. 3 | Production Example 10 No. 4 | Production Example 11 No. 5 | Production Example 12 No. 6 |
|---|---|---|---|---|---|---|---|
| agent | formic acid | | | | | | |
| | deionized water | 175 | 175 | 175 | 175 | 175 | 165 |
| | 34% emulsion | 309 (105) | 309 (105) | 309 (105) | 309 (105) | 309 (105) | 294 (100) |

Parenthesized numerals indicate the solid contents.
(Note 2)
Polyether polyol (a): HO—$(C_2H_4O)_3$—Be—$C(CH_3)_2$—Be—$(OC_2H_4)_3$—OH (wherein Be stands for benzene)
(Note 3)
SUNNIX pp-1,000: Sanyo Chemical Industries, Ltd., trademark, polypropylene glycol

Production Example 13

Pigment-Dispersed Paste

A pigment-dispersed paste having a solid content of 55.0 wt % was obtained by blending 60% quaternary ammonium salt-type epoxy resin, 5.83 parts (solid content: 3.5 parts); titanium white, 14.5 parts; carbon black, 0.3 part; extender, 7.0 parts; bismuth hydroxide, 1.0 part; dioctyltin oxide, 1 part; and deionized water, 20 parts.

Example 1

To 309 parts (solid content: 105 parts) of emulsion No. 1, 49.6 parts (solid content: 27.3 parts) of the pigment-dispersed paste as obtained in Production Example 13 and 302.9 parts of deionized water were added to provide cationic electrodeposition paint No. 1 having a solid content of 20%.

Examples 2-3; Comparative Examples 1-3

Cationic electrodeposition paint Nos. 2-6 were formulated each at the blend ratios shown in Table 2, similarly to Example 1.

TABLE 2

| Cationic electrodeposition paint | | Example 1 No. 1 | Example 2 No. 2 | Example 3 No. 3 | Comparative Example 1 No. 4 | Comparative Example 2 No. 5 | Comparative Example 3 No. 6 |
|---|---|---|---|---|---|---|---|
| paint composition | Emulsion No. 1 (additive No. 1) | 309 (105) | | | | | |
| | Emulsion No. 2 (additive No. 2) | | 309 (105) | | | | |
| | Emulsion No. 3 (additive No. 3) | | | 309 (105) | | | |
| | Emulsion No. 4 (polyether polyol) | | | | 309 (105) | | |
| | Emulsion No. 5 (SUNNIX PP-1000) | | | | | 309 (105) | |
| | Emulsion No. 6 | | | | | | 294 (100) |
| | Pigment-dispersed paste | 49.6 (27.3) | 49.6 (27.3) | 49.6 (27.3) | 49.6 (27.3) | 49.6 (27.3) | 49.6 (27.3) |
| | Deionized water | 302.9 | 302.9 | 302.9 | 302.9 | 302.9 | 292.9 |
| | 20% Bath | 661.5 (132.3) | 661.5 (132.3) | 661.5 (132.3) | 661.5 (132.3) | 661.5 (127.3) | 636.5 |

Parenthesized numerals indicate the solid contents.

Preparation of Test Panels

Using each of the cationic electrodeposition paints as obtained in the foregoing Examples and Comparative Examples, cold-rolled steel sheets which were given a chemical conversion treatment with PALBOND # 3020 (Nihon Parkerizing Co. Ltd., trademark, a zinc phosphate treating agent) and alloyed molten zinc-plated steel sheets were electrocoated. So obtained test panels were tested under the following test conditions. The results were as shown in Table 3.

TABLE 3

| Cationic electro-deposition paint | Example 1 No. 1 | Example 2 No. 2 | Example 3 No. 3 | Comparative Example 1 No. 4 | Comparative Example 2 No. 5 | Comparative Example 3 No. 6 |
|---|---|---|---|---|---|---|
| Film thickness retention Δ μm (Note 4) | 0 | 0 | 0 | 3 | 4 | 8 |
| Electrocoating ability for rust-proof steel sheet (Note 5) | ○ | ○ | ○ | Δ | Δ | X |
| Corrosion resistance (Note 6) | ○ | ○ | ○ | Δ | X | ○ |
| Sealer adherability (Note 7) | ○ | ○ | ○ | Δ | X | ○ |
| Paint stability (Note 8) | ○ | ○ | ○ | Δ | Δ | ○ |

(Note 4)

Film thickness retention:

The cold-rolled steel sheets as cathode were immersed in each of the cationic electrodeposition paint baths, and electrocoated at the bath temperature of 30° C. and at 250 V for 3 minutes, and baked at 170° C. for 20 minutes. Thickness of each coating film was measured . . . initial film thickness (1).

Then each of the cationic electrodeposition paint baths was stirred at 30° C. for 4 weeks, with the top of the paint containers left open. Using the baths, similar sheets were electrocoated at 30° C. and 250 V for 3 minutes and baked at 170° C. for 20 minutes similarly to the above, and thickness of each coating film was measured . . . film thickness after time passage (2).

The difference (μm) between the initial film thickness and the film thickness after time passage was determined as a norm for film thickness retention.

(Note 5)

Electrocoating ability for rust-proof steel sheet:

Using the cationic electrocoating baths which were used in the film thickness retention test (Note 4), the alloyed molten zinc-plated steel sheets were immersed as cathode in the baths which had been stirred at 30° C. for 4 weeks in the open-top containers, and electrocoated at a bath temperature of 30° C. under a voltage which resulted in 20 μm-thick coating film by 3 minutes' electrification, followed by baking drying. Thereafter the number of pinholes in each test panel (10 × 10 cm) was counted:

○: no pinhole formation,

Δ: 1–5 pinholes were formed,

X: 6 or more pinholes were formed.

(Note 6)

Corrosion resistance:

Each of the elecrocoating films (20 μm in thickness) formed on the cold-rolled steel sheets was given a cross-cut with a knife to the depth reaching the substrate, and subjected to a 840 hours' salt water resistance spray test following the method as specified by JISZ-2371. The corrosion resistance was evaluated based on widths of rusting and blisters from the knife cut, according to the following standard:

⊙: the maximum width of rusting and blisters was less than 2 mm from the cut (single side), ○: the maximum width of rusting and blisters was at least 2 mm but less than 3 mm from the cut (single side), Δ the maximum width of rusting and blisters was at least 3 mm but less than 4 mm from the cut (single side), X the maximum width of rusting and blisters was 4 mm or more from the cut (single side).

(Note 7)

Sealer adherability:

On each of the test panels provided by the cold-rolled steel sheets which had been electrocoated with the electrodeposition paint Nos. 1–6 to a film thickness of 20 μm, Sunstar 1065T (Sunstar Co., trademark, a sealer) was applied with the dimensions, 10 mm × 6 mm × 6 mm (length × width × thickness). The panels were then hung perpendicularly and shifting of the sealer was measured after 12 hours' hanging:

○: no sealer shifting and problem-free,

Δ: sealer shifting was not more than by 5 mm,

X: the sealer slipped down from the coated panel and feel.

(Note 8)

Paint stability:

Each of the cationic electrodeposition paint baths which had been stirred at 30° C. for 4 weeks in the open-top containers was filtered through 400-mesh filter net, and the filtration residue was measured:

○: less than 10 mg/L,

Δ: not less than 10 mg/L but less than 15 mg/L,

X: 15 mg/L or more.

Production Example 14

Additive No. 4

A stainless steel autoclave equipped with a stirrer and thermometer was charged with 160.3 parts of Butylethylpropanediol (Kyowa Hakko Chemical Co. Ltd., trademark, 2-butyl-2-ethyl-1,3-propanediol, molecular weight: 160.3) and 1.0 part of potassium hydroxide as the catalyst. After substituting the inside atmosphere of the autoclave with nitrogen, the content was dewatered. Then 88 parts of ethylene oxide (molecular weight: about 44) was introduced over a period of 1.5 hours at 130° C. Neutralizing the alkali catalyst in the reaction solution with 1.0 part of acetic acid, additive No. 4 (solid content: 100%) having average molecular weight of 248 was obtained.

Production Example 15

Additive No. 5

A stainless steel autoclave equipped with a stirrer and thermometer was charged with 160.3 parts of Butylethylpropanediol (Kyowa Hakko Chemical Co. Ltd., trademark, 2-butyl-2-ethyl-1,3-propanediol, molecular weight: 160.3) and 1.0 part of potassium hydroxide as the catalyst. After substituting the inside atmosphere of the autoclave with nitrogen, the content was dewatered. Then 116 parts of propylene oxide (molecular weight: about 58) was introduced over a period of 1.5 hours at 130° C. Neutralizing the alkali catalyst in the reaction solution with 1.0 part of acetic acid, additive No. 5 (solid content: 100%) having average molecular weight of 276 was obtained.

Production Example 16

Additive No. 6

A stainless steel autoclave equipped with a stirrer and thermometer was charged with 160.3 parts of Butylethylpropanediol (Kyowa Hakko Chemical Co. Ltd., trademark, 2-butyl-2-ethyl-1,3-propanediol, molecular weight: 160.3) and 1.0 part of potassium hydroxide as the catalyst. After substituting the inside atmosphere of the autoclave with nitrogen, the content was dewatered. Then 88 parts of ethylene oxide (molecular weight: about 44) and 116 parts of propylene oxide (molecular weight: about 58) were introduced over a period of 1.5 hours at 130° C. Neutralizing the alkali catalyst in the reaction solution with 1.0 part of acetic acid, additive No. 6 (solid content: 100%) having average molecular weight of 364 was obtained.

Production Example 17

Additive No. 7 (the Additive Disclosed in Example 1 of U.S. Pat. No. 4,891,111)

A reaction vessel was charged with 324 parts of diethylene glycol monobutyl ether, 31.6 parts of 95% para-formaldehyde and 0.3 part of methanesulfonic acid, and the inside atmosphere of the vessel was replaced with nitrogen. Thereafter the system was heated under reflux at about 100-about 120° C., and maintained for at least two hours under the refluxing condition. Then toluene was added, a reflux condenser and Dean-Stark water trap were mounted onto the reaction vessel. Heating under reflux was resumed to remove all of the water by azeotropic distillation. Thereafter the methanesulfonic acid in the reaction liquid was neutralized with aqueous sodium carbonate solution. Whereupon additive No. 7 (solid content: 100%) was obtained.

Production Example 18

Preparation of Emulsion No. 7

Additive No. 4 as obtained in Production Example 14, 5 parts (solid content, 5 parts); main resin No. 1, 87.5 parts (solid content, 70 parts; hardening agent, 33.3 parts (solid content, 30 parts) and 10% formic acid, 8.2 parts were blended and uniformly stirred. Thereafter 175 parts of deionized water was added to the blend dropwise, over a period of about 15 minutes under vigorous stirring, to provide emulsion No. 7 having a solid content of 34%.

Production Examples 19-21

Preparation of Emulsion Nos. 8-10

Emulsion Nos. 8-10 each having a solid content of 34% were obtained with the blend ratios as shown in Table 4, similarly to Production Example 18.

TABLE 4

| | Emulsion | Production Example 18 No. 7 | Production Example 19 No. 8 | Production Example 20 No. 9 | Production Example 21 No. 10 |
|---|---|---|---|---|---|
| Additive | Additive No. 4 | 5 (5) | | | 5 (5) |
| | Additive No. 5 | | 5 (5) | | |
| | Additive No. 6 | | | 5 (5) | |
| Main resin | Main resin No. 1 | 87.5 (70) | 87.5 (70) | 87.5 (70) | |
| | Main resin No. 2 | | | | 87.5 (70) |
| | Hardening Agent | 33.3 (30) | 33.3 (30) | 33.3 (30) | 33.3 (30) |
| Neutralizing agent | 10% formic acid | 8.2 | 8.2 | 8.2 | 8.2 |
| | Deionized water | 175 | 175 | 175 | 175 |
| | 34% emulsion | 309 (105) | 309 (105) | 309 (105) | 309 (105) |

Parenthesized numerals indicate solid contents.

Production Examples 22-29

Preparation of Emulsion Nos. 11-18

Emulsion Nos. 11-18 having a solid content of 34% were obtained with the blend ratios as shown in Table 5, similarly to Production Example 18.

TABLE 5

| | Emulsion | Production Example 22 No. 11 | Production Example 23 No. 12 | Production Example 24 No. 13 | Production Example 25 No. 14 | Production Example 26 No. 15 | Production Example 27 No. 16 | Production Example 28 No. 17 | Production Example 29 No. 18 |
|---|---|---|---|---|---|---|---|---|---|
| Additive | Additive No. 7 | 5 (5) | | | | 10 (10) | | | |
| | Polyether polyol (a) (Note) | | 5 (5) | | | | 10 (10) | | |
| | SUNIX pp-1000 (Note 3) | | | 5 (5) | | | | 10 (10) | |
| Main resin | Main resin No. 1 | 87.5 (70) | 87.5 (70) | 87.5 (70) | 87.5 (70) | 87.5 (70) | 87.5 (70) | 87.5 (70) | |
| | Main resin No. 2 | | | | | | | | 87.5 (70) |
| Hardening Agent | | 33.3 (30) | 33.3 (30) | 33.3 (30) | 33.3 (30) | 33.3 (30) | 33.3 (30) | 33.3 (30) | 33.3 (30) |
| Neutralizing agent | 10% formic acid | 8.2 | 8.2 | 8.2 | 8.2 | 8.2 | 8.2 | 8.2 | 8.2 |
| Deionized water | | 175 | 175 | 175 | 185 | 185 | 185 | 165 | 165 |
| 34% emulsion | | 309 (105) | 309 (105) | 309 (105) | 324 (110) | 324 (110) | 324 (110) | 294 (100) | 294 (100) |

Parenthesized numerals indicate solid contents.

Production Example 30

Preparation of Pigment-Dispersed Paste

A 60% quaternary ammonium salt-type epoxy resin, 5.83 parts (solid content: 3.5 parts); titanium white, 14.5 parts; carbon black, 0.3 part, an extender, 7.0 parts; bismuth hydroxide, 1.0 part; dioctyltin oxide, 1 part; and 20 parts of deionized water were blended, to form a pigment-dispersed paste having a solid content of 55.0 wt %.

Example 4

To 309 parts (solid content, 105 parts) of emulsion No. 7, 49.6 parts (solid content: 27.3 parts) of the pigment-dispersed paste as obtained in production Example 30 and 302.9 parts of deionized water were added, to provide cationic electrodeposition paint No. 7 having a solid content of 20%.

Examples 5-7

Cationic electrodeposition paint Nos. 8-10 were obtained similarly to Example 4, at the blend ratios as shown in Table 6.

TABLE 6

| Cationic electrodeposition paint | | Example 4 No. 7 | Example 5 No. 8 | Example 6 No. 9 | Example 7 No. 10 |
|---|---|---|---|---|---|
| Paint formula | Emulsion No. 7 | 309 (105) | | | |
| | (Additive No. 4) | | | | |
| | Emulsion No. 8 | | 309 (105) | | |
| | (Additive No. 5) | | | | |
| | Emulsion No. 9 | | | 309 (105) | |
| | (Additive No. 6) | | | | |
| | Emulsion No. 10 | | | | 309 (105) |
| | (Additive No. 4) | | | | |
| | Pigment-dispersed paste | 49.6 (27.3) | 49.6 (27.3) | 49.6 (27.3) | 49.6 (27.3) |
| | Deionized water | 302.9 | 302.9 | 302.9 | 302.9 |
| | 20% bath | 661.5 (132.3) | 661.5 (132.3) | 661.5 (132.3) | 661.5 (132.3) |

Parenthesized numerals indicate solid contents.

Comparative Examples 4-11

Cationic electrodeposition paint Nos. 11-18 were obtained similarly to Example 4, at the blend ratios as shown in Table 7.

TABLE 7

| Cationic electrodeposition paint | | Comparative Example 4 No. 11 | Comparative Example 5 No. 12 | Comparative Example 6 No. 13 | Comparative Example 7 No. 14 | Comparative Example 8 No. 15 | Comparative Example 9 No. 16 | Comparative Example 10 No. 17 | Comparative Example 11 No. 18 |
|---|---|---|---|---|---|---|---|---|---|
| Paint formula | Emulsion No. 11 | 309 (105) | | | | | | | |
| | Emulsion No. 12 | | 309 (105) | | | | | | |
| | Emulsion No. 13 | | | 309 (105) | | | | | |
| | Emulsion No. 14 | | | | 324 (110) | | | | |
| | Emulsion No. 15 | | | | | 324 (110) | | | |
| | Emulsion No. 16 | | | | | | 324 (110) | | |
| | Emulsion No. 17 | | | | | | | 294 (100) | |
| | Emulsion No. 18 | | | | | | | | 294 (100) |
| | Pigment-dispersed paste | 49.6 (27.3) | 49.6 (27.3) | 49.6 (27.3) | 49.6 (27.3) | 49.6 (27.3) | 49.6 (27.3) | 49.6 (27.3) | 49.6 (27.3) |
| | Deionized water | 302.9 | 302.9 | 302.9 | 312.9 | 312.9 | 312.9 | 292.9 | 292.9 |
| | 20% bath | 661.5 (132.3) | 661.5 (132.3) | 661.5 (132.3) | 686.5 (137.3) | 686.5 (137.3) | 686.5 (137.3) | 636.5 (127.3) | 636.5 (127.3) |

Parenthesized numerals indicate solid contents.

Preparation of Test Panels

Using each of the cationic electrodeposition paints as obtained in the foregoing Examples and Comparative Examples, cold-rolled steel sheets which were given a chemical conversion treatment with PALBOND # 3020 (Nippon Parkerizing Co. Ltd., trademark, a zinc phosphate treating agent) and alloyed molten zinc-plated steel sheets were electrocoated. So obtained test panels were tested under the same test conditions as previously described. The results of Examples 4-7 were as shown in Table 8, and those of Comparative Examples 4-11 were as shown in Table 9.

TABLE 8

| | Example 4 | Example 5 | Example 6 | Example 7 |
|---|---|---|---|---|
| Cationic electrodeposition paint | No. 7 | No. 8 | No. 9 | No. 10 |

TABLE 8-continued

| | Example 4 | Example 5 | Example 6 | Example 7 |
|---|---|---|---|---|
| Film thickness retention Δ μm (Note 4) | 0 | 0 | 0 | 0 |
| Electrocoating ability for rust-proof steel sheet (Note 5) | ○ | ○ | ○ | ○ |
| Corrosion resistance (Note 6) | ⊙ | ⊙ | ⊙ | ○ |
| Sealer adherability (Note 7) | ○ | ○ | ○ | ○ |
| Paint stability (Note 8) | ○ | ○ | ○ | ○ |

TABLE 9

| Cationic electrodeposition paint | Comparative Example 4 No. 11 | Comparative Example 5 No. 12 | Comparative Example 6 No. 13 | Comparative Example 7 No. 14 | Comparative Example 8 No. 15 | Comparative Example 9 No. 16 | Comparative Example 10 No. 17 | Comparative Example 11 No. 18 |
|---|---|---|---|---|---|---|---|---|
| Film thickness retention Δ μm (Note 4) | 4 | 3 | 3 | 2 | 2 | 2 | 6 | 7 |
| Electrocoating ability for rust-proof steel sheet (Note 5) | Δ | Δ | X | ○ | ○ | ○ | Δ | X |

TABLE 9-continued

| Cationic electro-deposition paint | Comparative Example 4 No. 11 | Comparative Example 5 No. 12 | Comparative Example 6 No. 13 | Comparative Example 7 No. 14 | Comparative Example 8 No. 15 | Comparative Example 9 No. 16 | Comparative Example 10 No. 17 | Comparative Example 11 No. 18 |
|---|---|---|---|---|---|---|---|---|
| Corrosion resistance (Note 6) | ○ | ○ | Δ | Δ | Δ | X | ○ | ○ |
| Sealer adherability (Note 7) | ○ | ○ | Δ | Δ | X | X | X | ○ |
| Paint stability (Note 8) | ○ | ○ | ○ | Δ | Δ | Δ | ○ | ○ |

The invention claimed is:

1. A cationic electrodeposition paint which contains a base resin, said base resin being an amine-added epoxy resin, a curing agent, said curing agent being a blocked polyisocyanate compound, and at least one polyether compound which is selected from the group of compounds represented by the following formulae (1) and (4):

$$R^1-O-CH_2-\underset{\underset{OH}{|}}{CH}-CH_2-O-(CH_2\underset{\underset{R^2}{|}}{C}HO)_p-R^3 \qquad (1)$$

$$HO-(\underset{\underset{R^6}{|}}{C}HCH_2O)_m-R^5-O-(CH_2\underset{\underset{R^7}{|}}{C}HO)_n-H \qquad (4)$$

in which:

$R^1$ and $R^3$ stand for $C_{1-10}$ alkyl or phenyl independently of each other, $R^2$ stands for hydrogen or methyl, and where p is not less than 2, the plural $R^2$s in the formula (1) may be the same or different, $R^5$ stands for $C_{4-9}$ branched chain alkylene, $R^6$ and $R^7$ stand for hydrogen, methyl or ethyl independently of each other, and where each of m and n is not less than 2, the plural $R^6$s or $R^7$s in the formula (4) may be the same or different, p is an integer of 0-4, m and n are integers of 1-5, independently of each other, the polyether compounds of the formula (1) being obtained through a reaction of a glycidyl ether compound represented by the following formula:

$$R^1-O-CH_2-\underset{\underset{O}{\diagdown\diagup}}{CH-CH_2} \qquad (5)$$

in which $R^1$ has the same meaning as defined above, with an alcoholic compound represented by the following formula:

$$R^3-O-(CH_2\underset{\underset{R^2}{|}}{C}HO)_p-H \qquad (6)$$

in which $R^2$, $R^3$ and p have the same meanings as defined above, the polyether compounds of the formula (4) being obtained through a reaction of a diol selected from the group consisting of 1,3-butanediol, 2,3-butanediol, 1,2-butanediol, 3-methyl-1,2-butanediol, 1,2-pentanediol, 1,4-pentanediol, 2,4-pentanediol, 2,3-dimethyltrimethylene glycol, 2-methyl-1,3-propanediol, 2-butyl-2-ethyl-1,3-propanediol, 3-methyl-4,3-pentanediol, 3-methyl-4,5-pentanediol, 2,2,4-trimethyl-1,3-pentanediol, 1,5-hexanediol, 2,5-hexanediol and neopentyl glycol with alkylene oxides represented by the following formulae:

$$R^6-\underset{\underset{O}{\diagdown\diagup}}{CH-CH_2} \qquad (11)$$

$$R^7-\underset{\underset{O}{\diagdown\diagup}}{CH-CH_2} \qquad (12)$$

in which $R^6$ and $R^7$ have the same meanings as defined above, and the blend ratio of said polyether compound being in a range of 0.1-20 weight parts, as solid, per 100 parts of combined solid contents of the base resin and the curing agent, said paint comprising an emulsion which is prepared by making water-dispersible the base resin, the curing agent and the polyether compound with a neutralizing agent in an aqueous medium.

2. The cationic electrodeposition paint according to claim 1, in which the polyether compound has a molecular weight not more than 1,000.

3. The cationic electrodeposition paint according to claim 1, in which the polyether compound has a molecular weight within a range of 250-800.

4. Coated articles which are coated with the cationic electrodeposition paint as described in claim 1.

* * * * *